US010448288B2

(12) United States Patent
Kim et al.

(10) Patent No.: US 10,448,288 B2
(45) Date of Patent: *Oct. 15, 2019

(54) APPARATUS AND METHOD FOR COMMUNICATING VOICE DATA IN A WIRELESS NETWORK

(71) Applicant: Samsung Electronics Co., Ltd., Gyeonggi-do (KR)

(72) Inventors: Hye-Jeong Kim, Gyeonggi-do (KR); Sung-Jin Park, Seoul (KR); Sung-Jun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,224

(22) Filed: Aug. 13, 2018

(65) Prior Publication Data

US 2018/0359663 A1     Dec. 13, 2018

Related U.S. Application Data

(63) Continuation of application No. 14/668,273, filed on Mar. 25, 2015, now Pat. No. 10,051,523.

(30) Foreign Application Priority Data

Mar. 26, 2014   (KR) .................. 10-2014-0035283

(51) Int. Cl.
*H04L 29/06*     (2006.01)
*H04W 36/00*    (2009.01)
(Continued)

(52) U.S. Cl.
CPC ..... *H04W 36/0022* (2013.01); *H04L 65/1069* (2013.01); *H04W 24/10* (2013.01);
(Continued)

(58) Field of Classification Search
CPC .............. H04L 65/1069; H04W 24/10; H04W 36/0022; H04W 36/14
See application file for complete search history.

(56) References Cited

U.S. PATENT DOCUMENTS

| 2002/0085516 A1 | 7/2002 | Bridgelall |
| 2005/0059400 A1 | 3/2005 | Jagadeesan et al. |

(Continued)

FOREIGN PATENT DOCUMENTS

CN          1826820          8/2006

OTHER PUBLICATIONS

Qualcomm, "Volte with SRVCC: The Second Phase of Voice Evolution for Mobile LTE Devices", White Paper, Oct. 2012, 11 pages.

(Continued)

*Primary Examiner* — Gbemileke J Onamuti
(74) *Attorney, Agent, or Firm* — The Farrell Law Firm, P.C.

(57) ABSTRACT

An apparatus that uses a method for processing handover by a terminal linked to a wireless network included in heterogeneous wireless networks and conducting a voice call service is provided. The method includes determining whether the terminal is required to perform handover of another wireless network included in the heterogeneous wireless networks, and upon determining that the handover is required, performing handover to the another wireless network, wherein the handover is determined by applying at least one handover condition to each of predetermined operation modes in the terminal conducting the voice call service.

20 Claims, 12 Drawing Sheets

(51) Int. Cl.
  *H04W 24/10* (2009.01)
  *H04W 36/14* (2009.01)
  *H04W 36/10* (2009.01)
  *H04W 36/36* (2009.01)
  *H04W 52/02* (2009.01)
  *H04W 36/30* (2009.01)
  *H04W 84/12* (2009.01)
  *H04W 88/06* (2009.01)

(52) U.S. Cl.
  CPC ............ *H04W 36/14* (2013.01); *H04W 36/30* (2013.01); *H04W 36/36* (2013.01); *H04W 52/0274* (2013.01); *H04W 84/12* (2013.01); *H04W 88/06* (2013.01); *Y02D 70/00* (2018.01); *Y02D 70/1222* (2018.01); *Y02D 70/1262* (2018.01); *Y02D 70/1264* (2018.01); *Y02D 70/142* (2018.01); *Y02D 70/144* (2018.01); *Y02D 70/166* (2018.01); *Y02D 70/23* (2018.01)

(56) References Cited

U.S. PATENT DOCUMENTS

| | | |
|---|---|---|
| 2005/0271011 A1 | 12/2005 | Alemany et al. |
| 2008/0113692 A1 | 5/2008 | Zhao et al. |
| 2008/0299974 A1 | 12/2008 | Lee et al. |
| 2010/0208604 A1 | 8/2010 | Kazmi |
| 2012/0163344 A1* | 6/2012 | Bakthavathsalu .... H04W 36/30 370/332 |
| 2012/0258704 A1 | 10/2012 | Kim et al. |
| 2012/0315905 A1 | 12/2012 | Zhu et al. |
| 2013/0100887 A1 | 4/2013 | Kim |
| 2015/0163811 A1 | 6/2015 | Konstantinou |

OTHER PUBLICATIONS

Shwetha Vittal, "Single Radio Voice Call Continuity (SRVCC) with LTE", Radisys White Paper, Sep. 2011, 11 pages.
International Search Report dated Jun. 29, 2015 issued in counterpart application No. PCT/KR2015/002994, 9 pages.
European Search Report dated Aug. 13, 2015 issued in counterpart application No. 15161150.6.-1854, 7 pages.
Samsung, "Discussion: Identifying Sessions Targeted for Session Transfer", C1-110322, 3GPP TSG CT WG1 Meeting #69, Jan. 24-28, 2011, 6 pages.
Samsung, "Identifying Sessions Targeted for Session Transfer", TD S2-110358, 3GPP TSG SA WG2 Meeting #83, Feb. 21-25, 2011, 6 pages.
European Search Report dated Jan. 15, 2016 issued in counterpart application No. 15161150.6.-1854, 17 pages.
Chinese Office Action dated Dec. 19, 2018 issued in counterpart application No. 201580016393.8, 26 pages.

* cited by examiner

APPARATUS AND METHOD FOR COMMUNICATING VOICE DATA IN A WIRELESS NETWORK

PRIORITY

This application is a Continuation Application of U.S. patent application Ser. No. 14/668,273, filed on Mar. 25, 2015, and claims priority under 35 U.S.C. § 119(a) to Korean Patent Application Serial No. 10-2014-0035283, which was filed in the Korean Intellectual Property Office on Mar. 26, 2014, the content of each of which is incorporated herein by reference.

BACKGROUND OF THE INVENTION

1. Field of the Invention

The present invention relates generally to apparatuses and methods for communicating voice data in a wireless network, and more particularly, to providing voice services by a terminal in heterogeneous wireless networks.

2. Description of the Related Art

Wireless communication systems have been developed to provide communication services while users are on the move. Wireless communication systems started with voice communication services and can now offer high-speed data communication services.

For example, wireless communication systems for high-speed data communication services have been evolved from 3rd generation partnership project (3GPP) systems to long term evolution (LTE) systems. LTE systems may serve data communications up to 100 Mbps.

LTE systems have evolved to LTE-advanced (LTE-A) systems to speed up transmission. For ease of description, LTE system and LTE-A system are collectively referred to as LTE system, hereinafter.

Wireless local area networks (WLANs) come in use for covering a shadow area of a wireless communication service at low expenses. A WLAN is structured to expand the service area with access points (APs).

A wireless device selects an AP and links up with the selected AP in order to use communication services over a WLAN. For example, the wireless device can offer an AP selecting and linking schemes that are based on a basic service set (BSS) load over the WLAN.

In a wireless network where LTE networks and WLAN networks are mixed up, seamless handover between a WiFi network and a cellular network may be supported. In such a case, the serving base station may determine a handover to other base stations forming a heterogeneous network or homogeneous network.

The handover procedure between heterogeneous networks or base stations is typically performed by triggering the networks. However, handover between heterogeneous voice services may be done by triggering the terminal. By way of example, the terminal may determine whether to hand over between an LTE network-based voice service (Voice over LTE (VoLTE) service) and a WiFi network-based voice service (Voice over WiFi (VoWiFi) service) and trigger handover based on the determination. In such a case, the references by which the terminal determines whether to hand over may have a significant effect on handover performances. Accordingly, the references need to be prepared for enhancing the performance of a handover between heterogeneous voice services.

SUMMARY OF THE INVENTION

The present invention has been made to address at least the above mentioned problems and/or disadvantages and to provide at least the advantages described below.

An aspect of the present invention provides a communication apparatus and method supporting voice services through handover between heterogeneous wireless networks.

Another aspect of the present invention provides an apparatus and method for stably switching voice services through handover between heterogeneous wireless networks.

Another aspect of the present invention provides an apparatus and method for preparing a reference for determining whether handover is needed for changing a type of voice service in heterogeneous wireless networks and determines a handover based on the reference.

Another aspect of the present invention provides an apparatus and method for optimizing power consumption of a terminal upon supporting a voice service considering handover between heterogeneous wireless networks.

In accordance with an aspect of the present invention, a method for processing handover by a terminal linked to a wireless network included in heterogeneous wireless networks and conducting a voice call service is provided. The method includes determining whether the terminal is required to perform handover to another wireless network included in the heterogeneous wireless networks, and upon determining that the handover is required, performing the handover to the other wireless network. The handover is determined by applying at least one handover condition to each of predetermined operation modes in the terminal conducting the voice call service.

In accordance with an aspect of the present invention, an apparatus for processing handover by a terminal linked to a wireless network included in heterogeneous wireless networks and conducting a voice call service is provided. The apparatus includes a control module that is configured to determine whether the terminal is required to perform handover to another wireless network included in the heterogeneous wireless networks, and when the handover is required, control the handover to the other wireless network, and a wireless communication module that is configured to communicate a signal for one of the voice call service and the handover under control of the control module. The control module is configured to determine whether the handover is required by applying at least one handover condition to each of predetermined operation modes for the voice call service.

An embodiment according to the present invention provides handover for compatibility between a VoLTE service and a VoWiFi service, further satisfying a user of a voice service.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
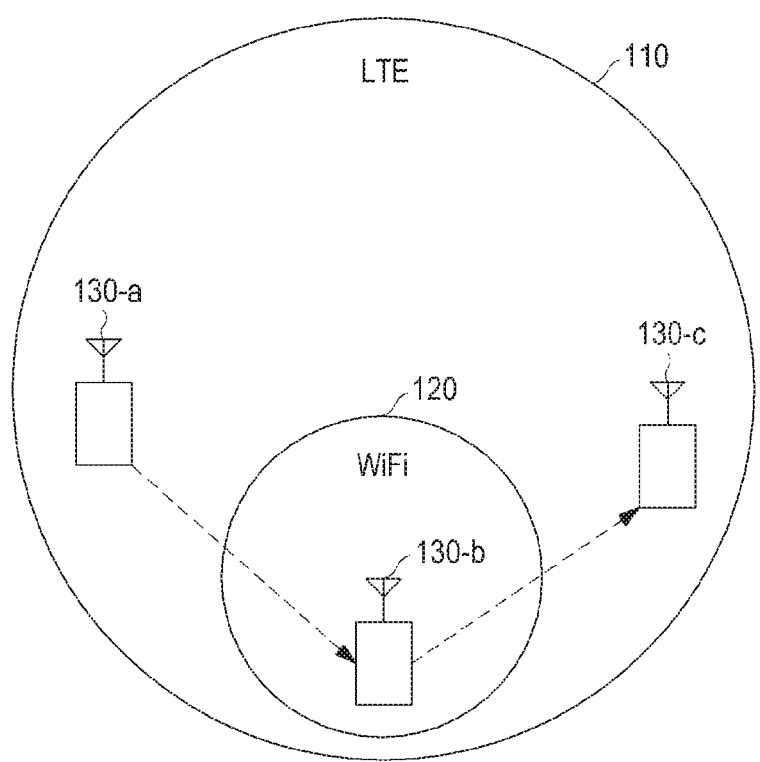
FIG. 1 is a diagram illustrating an example of handover by a terminal in heterogeneous wireless networks, according to an embodiment of the present invention.

Hereinafter, examples of embodiments of the present invention are configured to achieve the above objects. For ease of description, the same terms may be used throughout the specification to denote the components. However, the scope of the present invention is not limited by such terms, and the same or similar modifications may apply to systems with similar technical backgrounds.

Schemes for allowing a terminal to stably hand over a voice service between heterogeneous wireless networks are now described in detail.

To that end, according to embodiments of the present invention, to define operation modes for voice services and to set an operation mode that is to be considered for a terminal to determine handover between heterogeneous wireless networks are described herein. The operation mode may be selected from among predefined operation modes.

The terminal of the present invention supports voice services through a plurality of wireless networks constituting heterogeneous wireless networks.

The operation mode provides a user with an option allowing the user to select a preferred wireless network for a voice service. For example, the terminal may support both a cellular network and a WiFi network as wireless networks for a voice service.

In such a case, the operation modes may be classified into a cellular preferred mode, a WiFi preferred mode, a cellular only mode, and a WiFi only mode.

In the cellular preferred mode, priority is given to the cellular network upon a voice service. The cellular preferred mode may support a voice service through the WiFi network only when the voice service is difficult to support through the cellular network. Accordingly, the terminal with the operation mode set to the cellular preferred mode would support a voice service through the cellular network in case the cellular network is available. The voice service through the cellular network may include a VoLTE service or a circuit switching (CS) voice service. The voice service through the wireless network may include a VoWiFi service.

For ease of description, the voice service through the cellular network is referred to as a VoLTE service, and the voice service through the wireless network is referred to as a VoWiFi service. However, when required to be distinguished further, the voice service through the cellular network may be distinctly referred to as a VoLTE service and a CS voice service.

In the WiFi preferred mode, priority is given to the WiFi network upon a voice service. The WiFi preferred mode may support a VoLTE service or a CS voice service only when the VoWiFi service is difficult to support. Accordingly, the terminal with the operation mode set to the WiFi preferred mode would support a VoWiFi service in case the WiFi network is available.

The cellular only mode enables a voice service to be provided through only the cellular network. Accordingly, the terminal with the operation mode set to the cellular only mode would support a voice service through a VoLTE service or a CS voice service regardless of whether the cellular network or the WiFi network is available.

The WiFi only mode enables a voice service to be provided through only the WiFi network. Accordingly, the terminal with the operation mode set to the WiFi only mode would support a voice service through a VoWiFi service regardless of whether the cellular network or the WiFi network is available.

The operation modes of the terminal may be fixed given the state of the networks or voice services.

Considering the operation modes defined above, handover may occur only in the cellular preferred mode and WiFi preferred mode. Accordingly, the terminal with the operation mode set to the cellular preferred mode or WiFi preferred mode should be able to select one of the VoLTE service and the VoWiFi service depending on circumstances. The terminal would perform a handover procedure when required to switch to a different type of voice service.

According to an embodiment of the present invention, a condition for determining handover for the terminal to switch voice service types (hereinafter, referred to a 'handover condition') is defined. The handover condition is defined given the operation modes of the terminal. By way of example, different conditions for determining handover to change voice service types (hereinafter, referred to as 'handover conditions') may apply to when the operation mode is set to the cellular preferred mode and when the operation mode is set to the WiFi preferred mode. Different handover conditions being able to apply to the cellular preferred mode and the WiFi preferred mode may be identified by the above described definitions of the operation modes, as well.

For example, the terminal may determine handover conditions for each of the cellular preferred mode and the WiFi preferred mode based on the type or quality of the voice service currently in use by the terminal.

For example, the terminal with the operation mode set to the cellular preferred mode, even though a VoWiFi service is available while a VoLTE service is being offered, performs handover for switching from the VoLTE service to the VoWiFi service only when the VoLTE service is rendered impossible to support. The terminal with the operation mode set to the WiFi preferred mode, even though a VoLTE service is available while a VoWiFi service is being offered, performs handover for switching from the VoWiFi service to the VoLTE service only when the VoWiFi service is rendered impossible to support.

The situation where the VoLTE service is impossible to support means that an LTE network-based voice call is impossible to maintain, and the situation where the VoWiFi service is impossible to support means that a WiFi network-based voice call is impossible to maintain.

The terminal with the operation mode set to the cellular preferred mode, when the VoLTE service is rendered possible while the VoWiFi service is being offered, performs handover for switching to the VoLTE service. The terminal with the operation mode set to the WiFi preferred mode, when the VoWiFi service is rendered possible while the VoLTE service is being offered, performs handover for switching to the VoWiFi service.

According to an embodiment of the present invention, another option e given to the terminal for the VoWiFi service is to enable the terminal to designate a particular AP that is to receive the VoWiFi service.

For example, the user may set the terminal so that an AP installed in his home or working place is designated as the particular AP that is to receive a VoWiFi service. In such a case, the terminal provides the VoWiFi service through only the particular AP as set, not through any other APs. The terminal grants priority to the particular AP allowed to use the VoWiFi service, attempting to access the particular AP earlier than any other APs. Upon detecting the prioritized particular AP, the terminal, although already linked to other APs for a data service, attempts to connect to the particular AP.

Handover conditions for determining handover for each voice service type that is being offered by the terminal with the operation mode set to either the cellular preferred mode or the WiFi preferred mode are now described.

For example, the WiFi network may fail to provide seamless communications despite the high signal strength, if there are many users linked to the AP. Further, in a case where the users prefer the VoWiFi service, if the VoWiFi service is available while a VoLTE service-based voice call goes on, handover for switching to the VoWiFi service needs to be done. However, when the user is on the move and thus passes through a number of WiFi areas, the terminal detects multiple APs, ending up with frequent handover. This may cause the quality of a voice call to deteriorate or increase the likelihood of a voice call drop.

It is thus preferable for the terminal to perform handover according to the following conditions.

First, when the terminal with the operation mode set to the cellular preferred mode is conducting a voice call through the VoLTE service, even when detecting an AP where a voice call is available, the terminal does not attempt to switch to the VoWiFi service unless the terminal is under the situation where the voice call through the VoLTE service is about to drop. In other words, only when the voice call through the VoLTE service is about to drop does the terminal attempt to perform handover for switching to the VoWiFi service.

As an example, a first handover condition for the terminal, with the operation mode set to the cellular preferred mode, to determine to switch from VoLTE service to VoWiFi service requires that under circumstances with no APs available for voice service, the signal quality of the LTE network does not meet a predetermined threshold level and handover from the LTE network to a 2G or 3G network should not be triggered. The threshold level may be set, by the LTE network signal quality, to a value as high as the voice call through the VoLTE service does not drop.

The handover from the LTE network to the 2G or 3G network is based on single radio voice call continuity (SRVCC) technology such as inter-radio access technology (IRAT) measurements. Hereinafter, handover from LTE network to 2G or 3G network is denoted 'SRVCC handover.' APs available for voice services under the first handover condition may be determined by the following criteria:

1. APs connection to backbone: identifies whether a target AP is connected with the Internet.

2. AP congestion: may be predicted using data such as contention window size or nodes (terminals) connected to a target AP.

3. Data reception rate through AP (throughput estimation): may be measured under circumstances where a data service is carried out through WiFi, and a value measured upon a recent service may be put to use. The terminal may measure the throughput of the target AP by receiving some data for measuring throughput in an idle mode.

4. Round trip delay (RTD): checks a network delay using a test signal such as a ping. As an example, in the case of handover for VoWiFi service, it may be determined by a response to signaling obtained by triggering handover to an evolved packet data gateway (ePDG).

5. Terminal mobility: predicts terminal's current speed using a sensor or Doppler.

6. AP signal quality: received signal strength indication (RSSI) of a signal transmitted from AP, signal-to-noise ratio (SINR), and variation in the value.

7. Received packet error rate (PER).

Upon detecting an available WiFi network (available AP) based on the AP's throughput estimation among the above described criteria, the detected available WiFi network (available AP) may be deemed to also meet the other criteria regarding AP's connection to backbone, APs' congestion, and signal quality. The criteria regarding RTD, terminal mobility, and packet error rate, may additionally apply to verifying availability of the WiFi network (AP) detected based on the estimation of an AP's throughput.

Accordingly, it may be preferable that the terminal detects an available WiFi network (available AP) based on the throughput estimation and additionally verifies the same according to the RTD, terminal mobility and PER.

Second, in a case where the terminal with the operation mode set to the cellular preferred mode is in the middle of a voice call using the VoWiFi service, if the LTE network for VoLTE service is guaranteed for the minimum quality, the terminal attempts handover for switching to the VoLTE service.

By way of example, in a second handover condition for the terminal with the operation mode set to the cellular preferred mode, determining to switch from VoWiFi service to VoLTE service is satisfied by offering the minimum signal quality (predetermined threshold level) at which the LTE network may support the VoLTE service.

The threshold level in the first handover condition may be the same or different from the threshold level in the second handover condition. In a case where the threshold levels differ from each other, the threshold level in the second handover condition may be set to be relatively higher than the threshold level in the first handover condition. This is why the handover as per the first handover condition is conducted under circumstances where the WiFi network, which is effectively offering the VoWiFi service, is verified.

A signal quality of the cellular network may be defined using a value such as RSSI, reference signal received power (RSRP), reference signal received quality (RSRQ), SINR, transmission/reception error rate at each layer including physical layer, protocol layer, Internet protocol (IP) layer, and voice process layer, or packet transmission/reception delay.

Third, in a case where the terminal with the operation mode set to the WiFi preferred mode is in the middle of a voice call through the VoLTE service, the terminal, upon detecting an AP that is available for VoWiFi service, attempts handover for switching to the VoWiFi service.

By way of example, in a third handover condition for the terminal with the operation mode set to the WiFi preferred mode, determining to switch from VoLTE service to VoWiFi service, is satisfied by offering the minimum signal quality (predetermined threshold level) at which the WiFi network may support the VoWiFi service.

Fourth, in a case where the terminal with the operation mode set to the WiFi preferred mode is in the middle of a voice call through the VoWiFi service, the terminal does not attempt handover for switching to the VoLTE service unless the voice call through the VoWiFi service is about to be interrupted or lost. In other words, only when the voice call through the VoWiFi service is about to be interrupted or lost does the terminal attempt to perform handover for switching to the VoLTE service.

By way of example, in a fourth handover condition for the terminal with the operation mode set to the WiFi preferred mode, determining to switch from VoWiFi service to VoLTE service requires that, under the situation where a voice service is available in the LTE network, the signal quality of the WiFi network does not exceed a predetermined threshold level. The threshold level may be equal to a value of a signal quality that allows the VoWiFi service to maintain a voice call.

The same reference that is used for determining an AP under the first handover condition may be applied to determine the signal quality. However, although the same reference can be applied, the first handover condition and the fourth handover condition may differ from each other. For example, the first handover condition and the fourth handover condition may adopt different values for the PER.

When the operation mode of the terminal is set to the cellular preferred mode, switching from VoLTE service to VoWiFi service is prevented, and when the operation mode of the terminal is set to the WiFi preferred mode, switching from VoWiFi service to VoLTE service is prevented. However, when the operation mode of the terminal is set to the cellular preferred mode, switching from VoWiFi service to VoLTE service may be prevented, and when the operation mode set of the terminal is set to the WiFi preferred mode, switching from VoLTE service to VoWiFi service may be prevented.

The internal path used to switch between the VoLTE service and VoWiFi service is controlled depending on whether the terminal provides a voice call through the VoLTE service or through the VoWiFi service. For example, the terminal activates modules necessary for voice calls from among the internal modules of the terminal. Here, activating or deactivating the modules may include controlling power supplied thereto. Activating a module can include supplying power for operating the same, and deactivating a module can include supplying a minimum amount of power for operating the same. When a particular module is being supplied with the minimum operation power, this is referred to as a 'power saving mode.'

The modules operating in power saving mode may vary depending on whether the terminal provides a voice call through VoLTE service or through VoWiFi service. When the terminal switches service types for a voice call, a change of modules operating in power saving mode may occur.

Further, a scheme for processing handover to keep a voice call stable in a case where the handover for switching from VoLTE service to VoWiFi service and SRVCC handover are simultaneously triggered is provided. Accordingly, if an SRVCC handover is triggered by the network's determination and handover for switching from VoLTE service to VoWiFi service is triggered by the terminal's determination, the network and the terminal are unable to identify a situation of triggering the two handover procedures. If the two handover procedures are simultaneously performed, a physical collision may arise, causing the voice call to interrupted or dropped.

FIG. 1 is a diagram illustrating an example of handover by a terminal in heterogeneous wireless networks, according to an embodiment of the present invention. It is assumed that in connection with FIG. 1 the heterogeneous wireless networks include an LTE network and a WiFi network. The LTE network may be an example of a cellular network.

Referring to FIG. 1, the terminal 130-*a* starts a voice call in the LTE network 110 based on a VoLTE service. The terminal 130-*a* enters the WiFi network 120, and if a VoWiFi service is available, the terminal 130-*a* performs handover for switching to the VoWiFi service (represented by reference number 130-*b*). The terminal 130-*a* may selects a predetermined operation mode and a predetermined handover condition. The terminal 130-*a*, upon not meeting the predetermined handover condition, does not conduct handover. In such a case, the terminal 130-*a* maintains the VoLTE service-based voice call.

The terminal 130-*a*, upon departing from the WiFi network 120, while providing the voice call based on the VoWiFi service, performs handover for switching to the VoLTE service (represented by reference number 130-*c*). The terminal 130-*a* may select a predetermined operation mode and a predetermined handover condition. The terminal 130-*a*, upon not meeting the predetermined handover condition, does not conduct handover. In such a case, the terminal 130-*a* maintains the VoWiFi service-based voice call.

Figure 2:
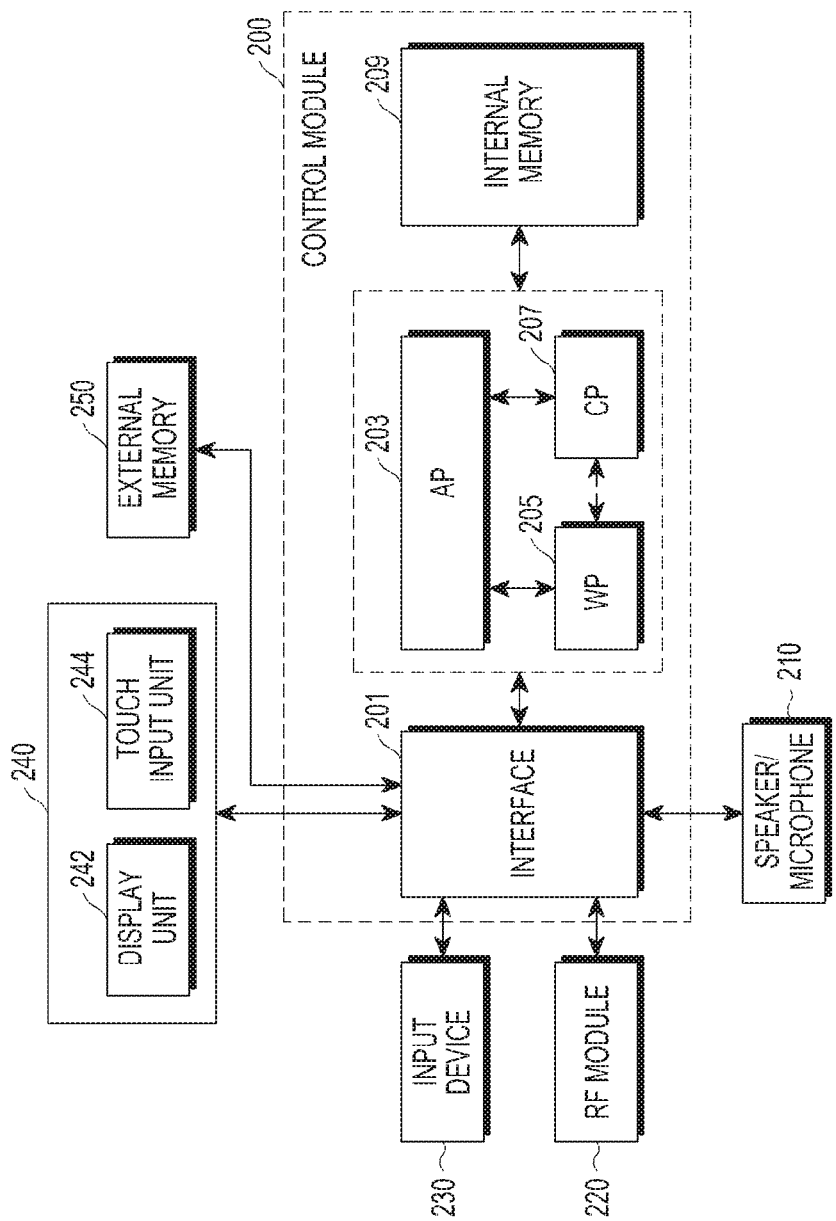
FIG. 2 is a block diagram illustrating a terminal supporting a voice service, according to an embodiment of the present invention.

FIG. 2 is a block diagram illustrating a configuration of a terminal supporting a voice service, according to an embodiment of the present invention. It is assumed that the terminal shown in FIG. 2 is supportive of both a cellular network-based VoLTE service and a WiFi network-based VoWiFi service. The cellular network includes a 2G network or 3G network, as well as the LTE network.

Referring to FIG. 2, the terminal 130-*a* (hereinafter, for ease of explanation, simply referred to as the terminal) includes a control module 200, a speaker/microphone 210, a wireless communication module (or radio frequency (RF) module) 220, an input device 230, a touch screen 240, and an external memory 250. There may be multiple external memories 250.

The control module 200 includes an interface 201, a processor, and an internal memory 209. The processor includes an application processor (AP) 203, a WiFi modem processor (WP) 205, and a cellular modem processor (CP) 207. The AP 203, the WP 205, and the CP 207 perform communications by way of inter processor communications (IPCs).

The AP 203, the WP 205, and the CP 207, constituting the processor, may be configured on separate integrated chip sets, respectively, or some or all thereof may be configured in a single integrated chip set.

For example, the AP 203, the WP 205, and the CP 207 may be embedded in a single chip set, or the WP 205 and the CP 207 can be embedded in a single chip set while the AP 203 can be embedded in a separate chip set. The AP 203 and the CP 207 may be embedded in a single chip set while the WP 205 can be embedded in a separate chip set, or the AP 203 and the WP 205 may be embedded in a single chip set while the CP 207 can be embedded in a separate chip set.

However, although two or three processors are embedded in a single chip set, each module may be independently operated, and power control may be conducted per module. The AP 203 needs interfaces with the WP 205 and the CP 207. An interface may be present between the WP 205 and the CP 207, or no interface may be provided therebetween.

The interface 201, the AP 203, the WP 205, the CP 207, and the internal memory 209, constituting the control module 200, may be integrated in at least one circuit or implemented in separate components. There may be multiple APs 203, multiple WPs 205, or multiple internal memories 209.

The AP 203 controls a multimedia service and a user interface (UI) using at least one software program. The AP 203 processes data communicated through a cellular network or WiFi network using an IP multimedia subsystem (IMS) stored in at least one of the internal memory 209 and the external memory 250. The AP 203 provides, e.g., a multimedia service or voice service. For example, if there is no interface between the WP 205 and the CP 207, the AP 203 supports a voice service that is a provided by the WP 205. That is, when there is no interface between the WP 205 and the CP 207, the AP 203 establishes or releases a path for a VoWiFi service based on a predetermined operation mode and handover condition.

The CP 207 processes voice signals and data communicated through the cellular network. If there is an interface between the CP 207 and the WP 205, the CP 207 supports a VoWiFi service that is a voice service provided by the WP 205. In such an instance, the CP 207 may include a communication protocol and a codec.

If there is an interface between the WP 205 and the CP 207, the CP 207 may selectively configure a path for VoLTE service and a path for VoWiFi service based on the predetermined operation mode and handover condition. When there is no interface between the WP 205 and the CP 207, the AP 207 establishes or releases a path for a VoLTE service based on a predetermined operation mode and handover condition.

The CP 207 controls an instant messaging service (IMS) using at least one IMS protocol stored in at least one of the internal memory 209 and the external memory 250. For example, the CP 207 supports at least one IMS defined in the IMS standards, from among Session Initiation Protocol (SIP), Session Description Protocol (SDP), Real-time Transfer Protocol (RTP), Real Time Control Protocol (RTCP), Message Session Relay Protocol (MSRP), Hyper Text Transfer Protocol (HTTP), Real Time Streaming Protocol (RTSP) and Hyper Text Transfer Protocol (HTTP), and Transmission Control Protocol/Internet Protocol (TCP/IP). The CP 207 supports the same IMS protocol as that of the AP 203 or only some protocols necessary for IMS services.

The WP 205 processes voice signals and data communicated through the WiFi network. The WP 205 supports a VoWiFi service through the CP 207 when there is an interface with the CP 207. When there is no interface with the CP 207, the WP 205 supports the VoWiFi service through the AP 203.

The WP 205 selectively configures a path for the VoWiFi service based on the predetermined operation mode and handover condition. For example, when there is an interface with the CP 207, the WP 205 connects the path for the VoWiFi service to the CP 207. When there is no interface with the CP 207, the WP 205 connects the path for the VoWiFi service to the AP 203.

The interface 201 connects an input/output peripheral device of the terminal with at least one of the AP 203, the WP 205, and the CP 207.

The internal memory 209 and the external memory 250 store a program for controlling the operation of the terminal, data generated as the terminal operates, and multimedia content. For example, the program includes an operating system program, a communication program, a graphic program, a user interface (UI) program, a protocol, a codec, and at least one application program.

The memory storing the protocol may separately store the respective protocols of the AP 203, the WP 205, and the CP 207. The at least one application program is a set of commands and may be represented as an instruction set.

The internal memory 209 may be configured separate from the AP 203, the WP 205, and the CP 207 or may be included in at least one of the AP 203, the WP 205, and the CP 207. The IMS service may be provided using at least one IMS protocol stored in an internal memory of each of the AP 203, the WP 205, and the CP 207 and TCP/IP.

The speaker/microphone 210 inputs/outputs audio signals. Although not shown, the terminal may input/output audio signals using any one of an earphone, a head phone, and a head set connected to the terminal through an external port.

The RF module 220 performs communication functions for voice communications and data communications. The RF module 220 may include multiple sub-modules for wireless communications, such as an antenna, a transceiver, and an RF sub-module. The RF module 220 may be separated into multiple communication sub-modules that support different communication networks. For example, the communication networks may include a Global System for Mobile Communication (GSM) network, an Enhanced Data GSM Environment (EDGE) network, a Code Division Multiple Access (CDMA) network, a Wideband-Code Division Multiple Access (W-CDMA) network, a Long Term Evolution (LTE) network, an Orthogonal Frequency Division Multiple Access (OFDMA) network, a wireless LAN, a Bluetooth network, and a Near Field Communication (NFC).

The input device 230 provides input data generated by the user's selection to the control module 200. For example, the input device 230 may be configured to include only a control button for controlling the terminal. As another example, the input device 230 may include a keypad for receiving input data from the user.

The touch screen 240 is an input/output device for inputting and outputting information and includes a display unit 242 and a touch input unit 244.

The display unit 242 displays information regarding the state of the terminal, text input by the user, moving pictures, and still pictures. The touch input unit 244 provides touch information sensed by a touch panel to the control module 200. The touch input unit 244 provides touch information created by a touch pen or finger to the control module 200.

Figure 3:
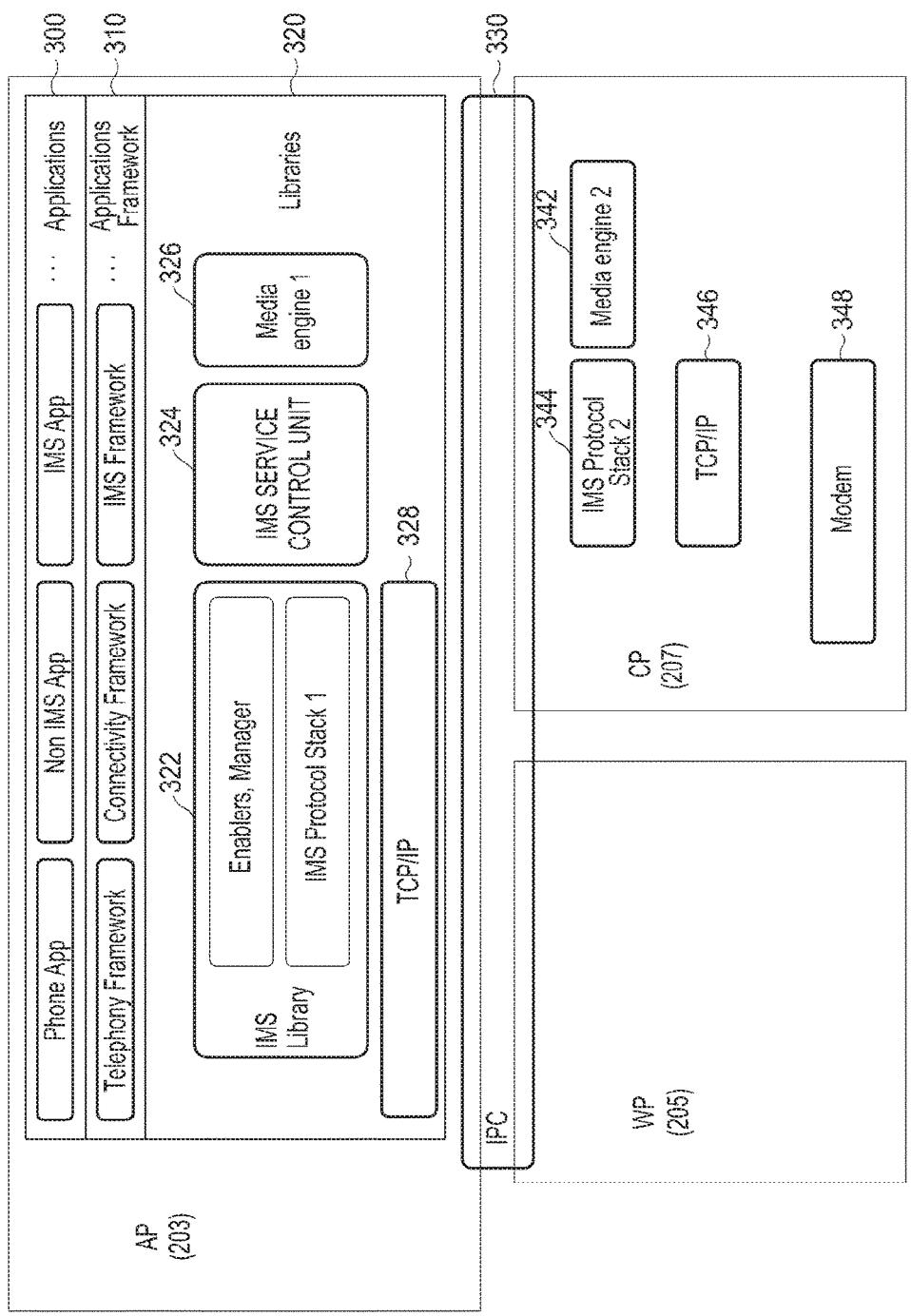
FIG. 3 is a block diagram illustrating a system, according to an embodiment of the present invention.

FIG. 3 is a block diagram illustrating the AP 203, the WP 205, and the CP 207, according to an embodiment of the present invention. Hereinafter, it is assumed that an IMS service is provided using TCP/IP and at least one IMS protocol stored in the respective internal memories of the AP 203, the WP 205, and the CP 207.

Referring to FIG. 3, the AP 203 performs the overall control of the terminal for providing, e.g., a multimedia service or voice service, using at least one software program. For example, the AP 203 includes an application layer 300, a library layer 320, and an application framework layer 310. The AP 203 may further include components other than those shown.

The application layer 300 represents an area where application programs are driven. For example, the application layer 300 drives an IMS application program, a non-IMS application program, and an application executable on the terminal (e.g., a phone application).

The application framework layer 310 connects the application layer 300 with the library layer 320.

The library layer 320 includes modules necessary for providing an IMS service, such as an IMS library 322, an IMS service control unit 324, a media engine 1 326, and a TCP/IP 328. The library layer 320 may further include components other than those shown.

The IMS library 322 includes devices and software necessary for driving an IMS application program and an IMS protocol stack1. For example, the IMS protocol stack 1 includes protocols defined in the IMS standards such as SIP, SDP, RTP, RTCP, RTSP, MSRP, and HTTP.

The IMS service control unit 324 determines whether to use the IMS protocol stack 1 and the media engine 1 326 included in the AP 203 and the IMS protocol stack 2 344 and the media engine 2 342 included in the CP 207 in order to provide an IMS service. For example, the IMS service control unit 324 controls the IMS protocol stack 1 of the AP 203 to interact with the application program while serving as a master in order to provide an IMS service. The IMS service control unit 324 controls the drive of the IMS protocol stack 2 344 and media engine 2 342 of the CP 207 in order to provide an IMS service.

The media engine 1 326 includes devices and software necessary for processing video data and audio data. For example, the media engine 1 326 includes at least one of a video engine including devices and software necessary for processing video data and an audio engine including a device and software necessary for processing audio data.

The CP 207 includes a modem transceiver 348 which processes communications with an external base station. For example, the modem transceiver 348 includes multiple sub-modules, such as an interface with an RF system, a physical layer, and a modem protocol stack. The modem transceiver 348 may be separated into multiple communication sub-modules that are supportive of different communication networks.

The CP 207 includes a media engine 2 342, an IMS protocol stack 2 344, and a TCP/IP 346 for processing IMS data in order to provide an IMS service. The CP 207 may further include components other than those shown.

The AP 203 includes an IMS protocol stack 1 for processing IMS data, and the CP 207 includes the IMS protocol stack 2 344 for processing IMS data. The IMS protocol stack 1 and the IMS protocol stack 344 likewise include all the IMS protocols necessary for an IMS service.

The IMS protocol stack 2 344 may be configured as a subset of the IMS protocol stack 1. That is, the IMS protocol stack 1 may include all of the IMS protocols necessary for an IMS service, and the IMS protocol stack 2 344 may include some of the IMS protocols necessary for the IMS service. Specifically, the IMS protocol stack 2 344 may include an RTP/RTCP protocol or some functions of an SIP protocol and the RTP/RTCP protocol. However, the IMS protocol stack 1 and the IMS protocol stack 2 344 may include different IMS protocols.

The AP 203 includes the media engine 1 326, and the CP 207 includes the media engine 2 342. The media engine 1 326 and the media engine 2 342 likewise include a video engine and an audio engine. As another example, the media engine 1 326 may include a video engine and an audio engine, and the media engine 2 342 may include an audio engine. As still another example, the media engine 1 326 may include a video engine, and the media engine 2 342 may include an audio engine.

Figure 4:
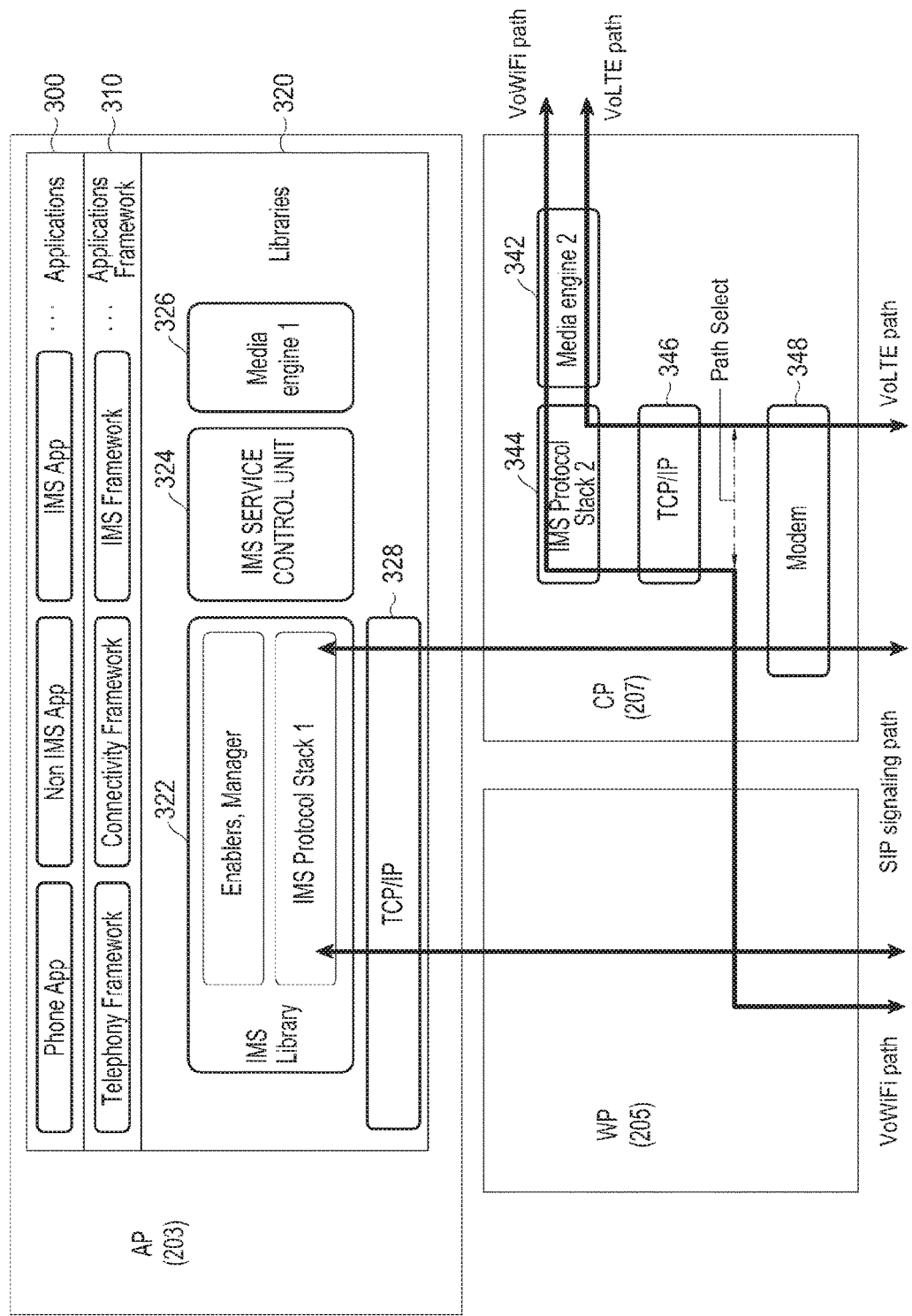
FIG. 4 is a block diagram illustrating an example of a path for a voice service, according to an embodiment of the present invention.

FIG. 4 is a block diagram illustrating an example of a path for a voice service, in case there is an interface between the WP 205 and the CP 207 constituting the terminal, according to an embodiment of the present invention. FIG. 4 illustrates an example of selecting a path in the CP 207 depending on which type of voice service applies from among a VoLTE service and a VoWiFi service for a voice call. The selection of a path for a voice service in the CP 207 may be done upon establishing an initial call or when changing the type of voice service according to handover.

For example, the CP 207 determines whether to conduct handover for changing the type of voice service being currently provided, a predetermined operation mode and handover condition. When the type of voice service to be provided is changed due to handover, the CP 207 configures a path appropriate for the changed voice service. The type of voice services that is changeable by the CP 207 includes a VoLTE service and a VoWiFi service.

Figure 5:
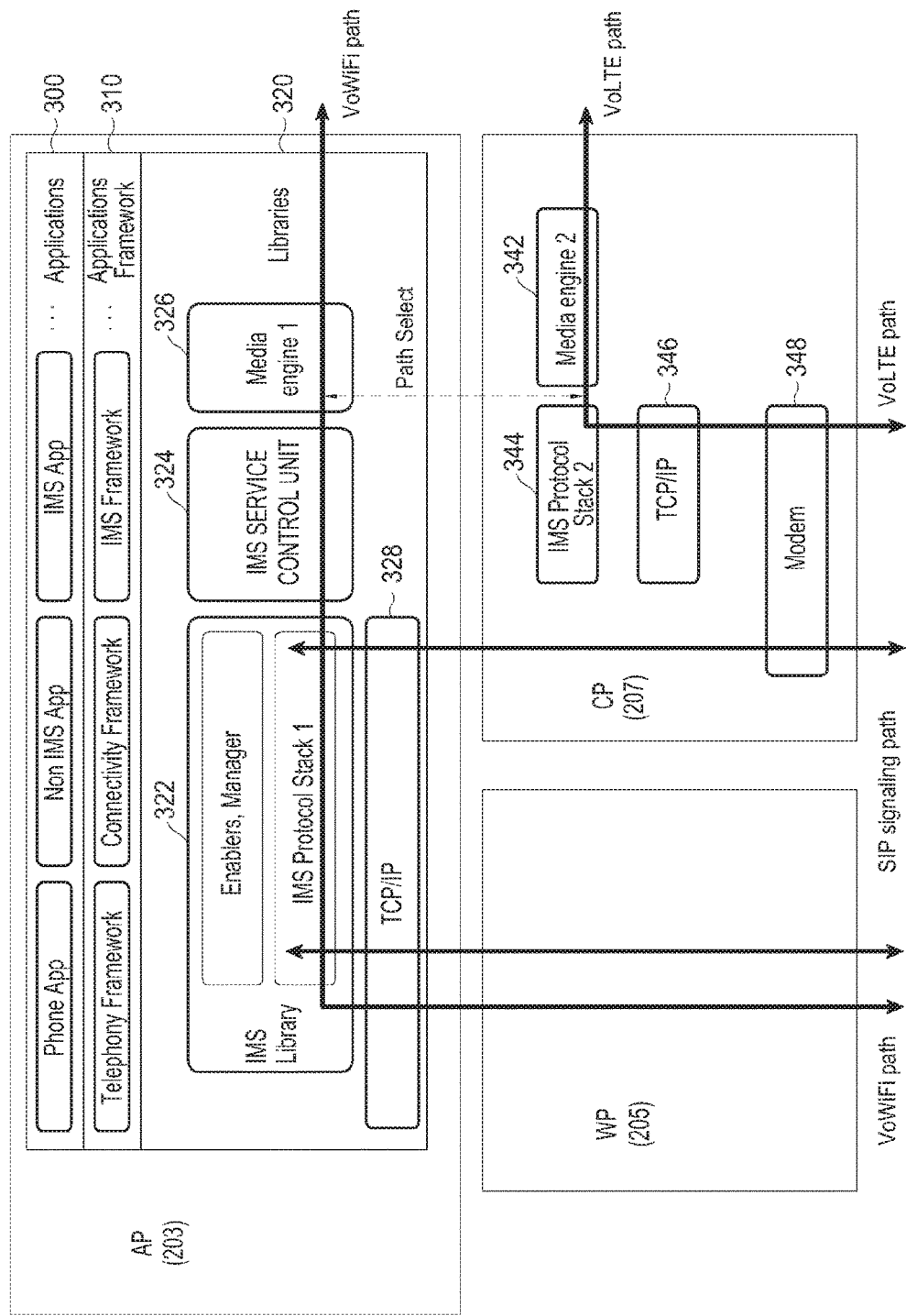
FIG. 5 is a block diagram illustrating another example of a path for a voice service, according to an embodiment of the present invention.

FIG. 5 is a block diagram illustrating an example of a path for a voice service, in case there is no interface between the WP 205 and the CP 207 constituting the terminal, according to an embodiment of the present invention. FIG. 5 illustrates an example of selecting a path by the CP 207 and a path by the AP 203 depending on which type of voice service applies from among a VoLTE service and a VoWiFi service for a voice call.

For example, when a voice call is determined to be the VoLTE service, the CP 207 configures a path for the VoLTE service. When the voice call is determined to be the VoWiFi service, the AP 203 configures a path for offering the voice call to the WP 205 based on the VoWiFi service.

Configuring a path depending on the type of voice service as described above may be varied through handover. The handover may be determined based on a predetermined operation mode, the type of a voice service being provided, and a handover condition. That is, the path for the CP 207 to provide a voice call based on the VoLTE service and the path for the AP 203 to provide a voice service based on the VoWiFi service may be selected considering a predetermined operation mode, the type of a voice service being provided, and a handover condition.

Figure 6:
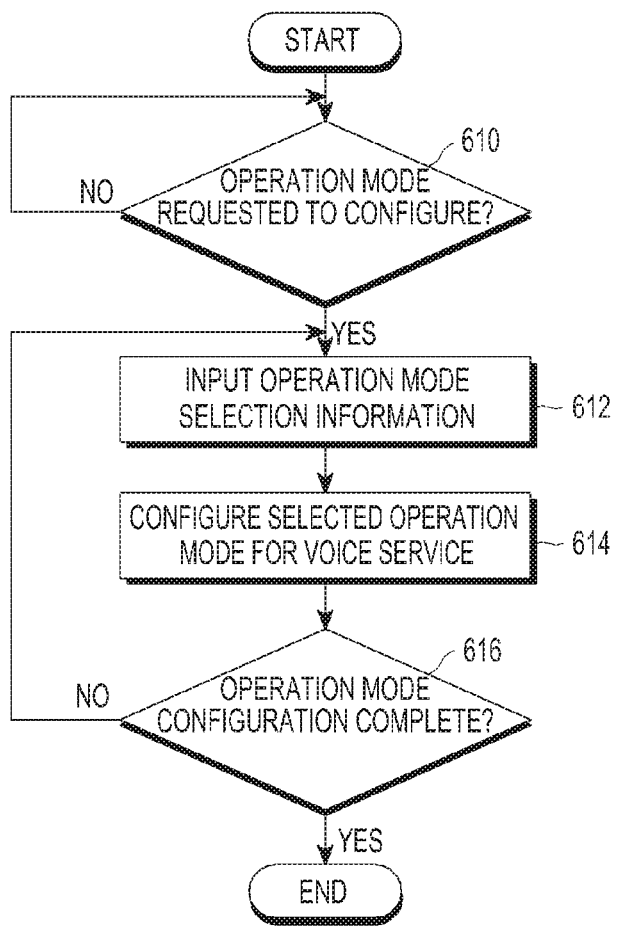
FIG. 6 is a flowchart illustrating a method of control flow where a terminal configures an operation mode for a voice communication service in a mobile wireless network, according to an embodiment of the present invention.

FIG. 6 is a flowchart illustrating a method of a control flow in which a terminal configures an operation mode for a voice call service in a mobile wireless network, according to an embodiment of the present invention In the following description, it is assumed that the operation mode includes only the cellular preferred mode, WiFi preferred mode, cellular only mode, and WiFi only mode.

Referring to FIG. 6, the terminal monitors whether an operation mode for a voice call service is requested, at step 610. Configuring the operation mode may be requested by manipulating the terminal or by control information coming from a remote site connected over a network.

When the operation mode is requested, the terminal receives selection information regarding an operation mode to be configured, at step 612. The selection information may be input by directly manipulating the terminal or by the control information received through the network. For example, the selection information for selecting an operation mode is information for selecting one of the cellular preferred mode, the WiFi preferred mode, the cellular only mode, and the WiFi only mode.

The terminal configures the operation mode for a voice call service corresponding to the selected operation mode, at step 614. The terminal determines whether the operation mode configuration has been completed, at step 616. The completion of the operation mode configuration may be indicated by the user or by control information received from the remote site, such as when the operation mode is requested.

The terminal, when the operation mode configuration is incomplete, performs a procedure for changing the earlier configured operation mode to other operation modes, at steps 612 and 614. The terminal, upon determining that the operation mode configuration has been completed, terminates the whole procedure for configuring the operation mode.

Figure 7:
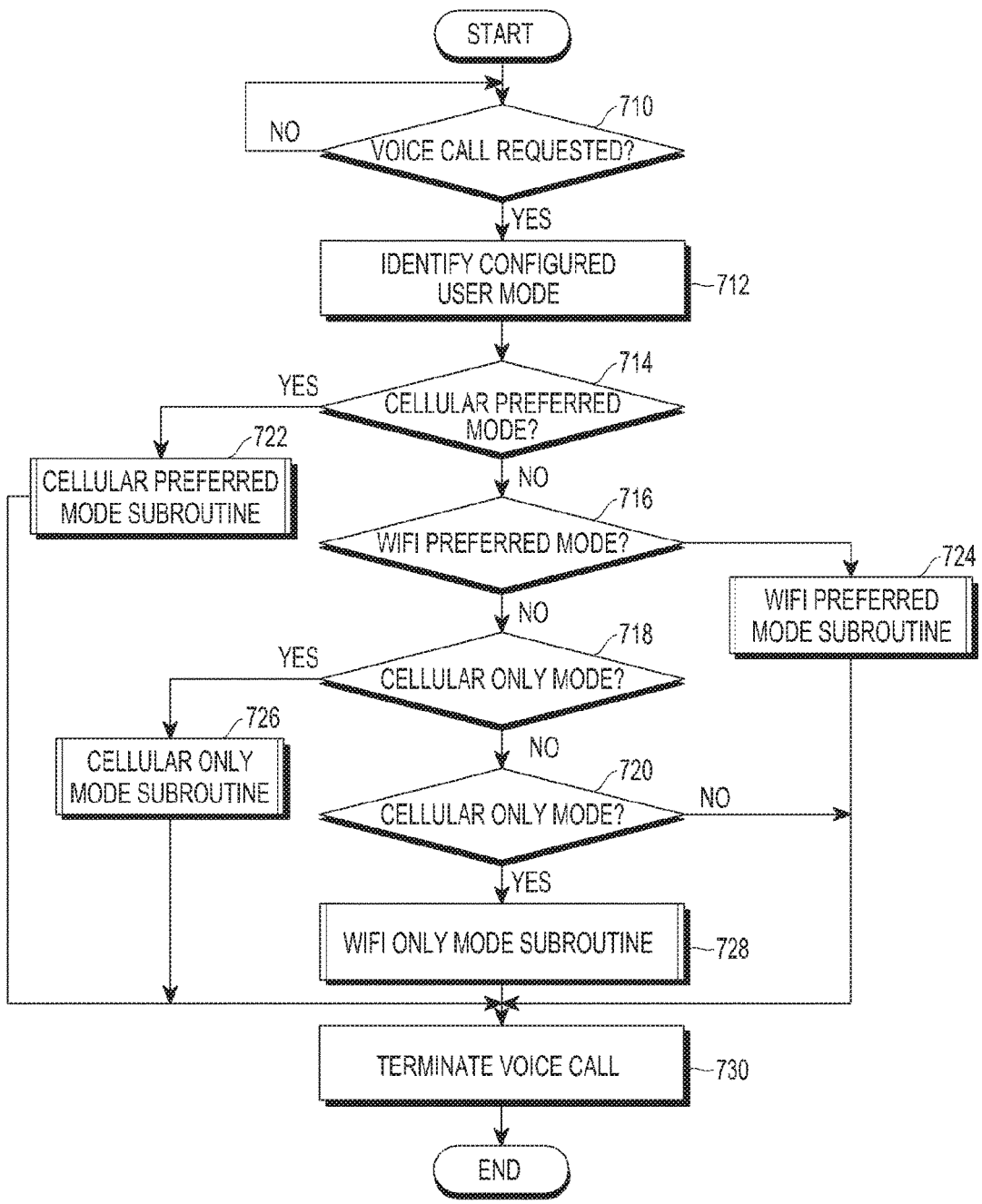
FIG. 7 is a flowchart illustrating a method of control performed by a terminal, according to an embodiment of the present invention.

FIG. 7 is a flowchart illustrating a method of a control flow for a terminal to provide a voice service in heterogeneous wireless networks, according to an embodiment of the present invention. The terminal is presumed to support a VoLTE service and a VoWiFi service. The terminal may perform the same operation even under the situation where the terminal offers voice services based on 2G, 3G, or other typical cellular networks.

Referring to FIG. 7, the terminal determines whether a voice call request occurs, at step 710. A voice call request, as per a mobile-originated (MO) call from the user and a voice call request as per a mobile-terminated (MT) call, both, are taken into account. During the voice call request, it is assumed that the terminal remains attached to the LTE network, the terminal is associated with the packet data network (PDN), and the voice call request has been done with IMS registration.

The terminal, when a voice call is requested, identifies operation modes configured for a voice service, at step 712. The operation modes are configurable for a voice service and include the cellular preferred mode, the WiFi preferred mode, the cellular only mode, and the WiFi only mode.

When identifying the operation modes, the terminal determines which one of the cellular preferred mode, the WiFi preferred mode, the cellular only mode, and the WiFi only mode is the identified operation mode, at steps 714 to 720.

For example, the terminal, upon determining that the cellular preferred mode has been configured, at step 714, performs the operation corresponding to the cellular preferred mode sub-routine, at step 722. The terminal, upon determining that the WiFi preferred mode has been configured, at step 716, performs the operation corresponding to the WiFi preferred mode sub-routine at step 724. The terminal, upon determining that the cellular only mode has been configured, at step 718, performs the operation corresponding to the cellular only mode sub-routine at step 726. The terminal, upon determining that the WiFi only mode has been configured, at step 720, performs the operation corresponding to the WiFi only mode sub-routine at step 728.

When the voice service is complete through the sub-routine corresponding to the configured operation mode, the terminal terminates the voice call, at step 730.

As set forth above, the terminal, upon generation of an incoming or outgoing voice call, determines whether the voice call comes from the VoLTE service or from VoWiFi service.

For example, the terminal, upon creation of a voice call, identifies what operation mode has been configured for the voice service. If the operation mode has been set to the cellular preferred mode or the cellular only mode, the terminal determines that the voice call is processed by the VoLTE service. If the operation mode has been set to the WiFi preferred mode or the WiFi only mode, the terminal determines that the voice call is processed by the VoWiFi service.

Even when the operation mode has been set to the cellular preferred mode, the terminal may process the voice call through the VoWiFi service, and even when the operation mode has been set to the WiFi preferred mode, the terminal may process the voice call through the VoLTE service.

For example, if the operation mode has been set to the cellular preferred mode, upon failure to meet a condition configured for the VoLTE service, the terminal uses the VoWiFi service. The condition configured for the VoLTE service may be a condition configured to determine the minimum wireless communication environment required for the VoLTE service. That is, the condition configured for the VoLTE service corresponds to a condition for determining that it is impossible to connect the voice call by the VoLTE service.

If the operation mode has been set to the WiFi preferred mode, upon failure to meet a condition configured for the VoWiFi service, the terminal provides the VoLTE service. The condition configured for the VoWiFi service may be a condition configured to determine the minimum wireless communication environment required for the VoWiFi service. That is, the condition configured for the VoWiFi service corresponds to a condition for determining that it is impossible to connect the voice call by the VoWiFi service.

A representative condition for determining that connecting the voice call is impossible may be, for example, the strength of a signal transmitted from the LTE network or WiFi network. In other words, if the strength of a signal coming from the LTE network or WiFi network is insufficient to support the voice service, the terminal determines that connecting the voice call is impossible. Additionally, a congestion of the LTE network or WiFi network, packet error rate, or interference, as described above, may also be used to prepare conditions for determining that connecting the voice call is impossible.

If the operation mode has been set to the cellular only mode or the WiFi only mode, the terminal determines that the voice call is processed through the VoLTE service or VoWiFi service by the configured operation mode, without considering the wireless communication environment of the LTE network or WiFi network.

Figure 8:
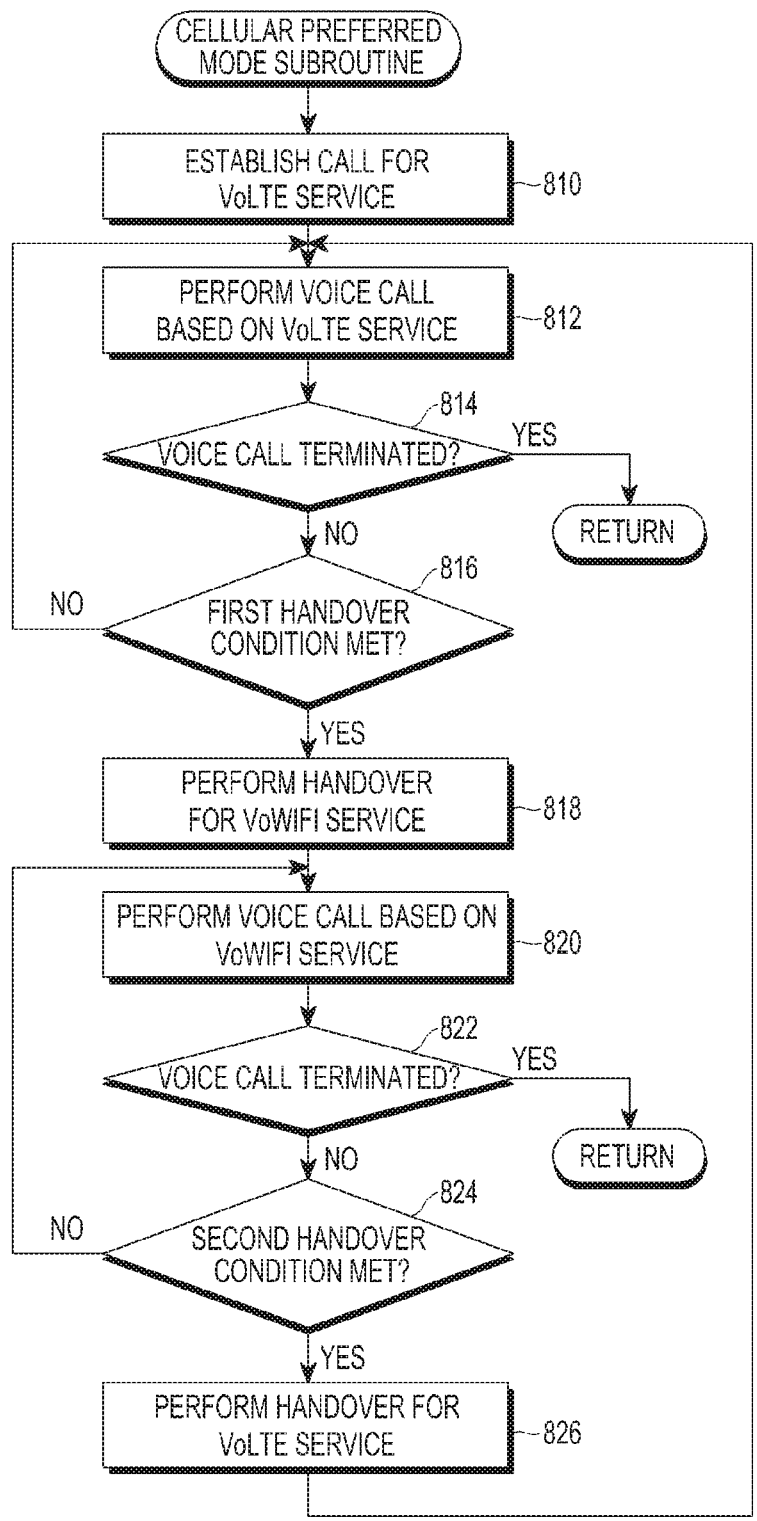
FIG. 8 is a flowchart illustrating a method of control flow of a cellular preferred mode subroutine, according to an embodiment of the present invention.

FIG. 8 is a flowchart illustrating a method of a control flow in which a terminal provides a voice service by a cellular preferred mode subroutine, according to an embodiment of the present invention. The terminal is presumed to support a VoLTE service and a VoWiFi service. The terminal may perform the same operation even under the situation where the terminal offers voice services based on 2G, 3G, or other typical cellular networks.

Referring to FIG. 8, the terminal establishes a call for a VoLTE service, at step 810. This includes establishing a path for a voice service that is responsive to an incoming call or outgoing call, and determining power control based on the established path.

For example, if the call is established for a VoLTE service, the CP 207 forms a voice service path to perform a voice call based on the VoLTE service. Examples of the voice service path formed for the VoLTE service are shown in FIGS. 4 and 5. Moreover, if the call is established for the VoLTE service, the AP 203 and the WP 205, which are not involved in the voice service, are set to power saving mode in order to minimize power consumed by the AP 203 and the WP 205.

If the call established for the VoLTE service is selected, the terminal performs a voice call through the VoLTE service, at step 812. That is, the user conducts the VoLTE service-based voice call through the terminal.

While the voice call is in progress, the terminal determines whether the voice call is terminated, at step 814. Upon determining termination of the voice call, the terminal goes back to the main routine to terminate the voice call.

If the voice call continues, the terminal determines whether a situation meeting the first handover condition occurs, at step 816. The first handover condition may be previously configured and is a handover condition that allows the terminal to switch the voice service from VoLTE service to VoWiFi service, under circumstances where the operation mode has been set to the cellular preferred mode.

For example, the AP 203, to support a VoWiFi service, may be selected taking into consideration the AP 203 throughput estimation, RTD, terminal mobility, and packet error rate of the first handover condition. The AP's 203 throughput may be estimated assuming the AP's 203 connection to backbone, the AP's 203 congestion, SNIR of the AP 203 signal and variation, etc. The first handover condition has been set forth above.

The terminal, without any circumstances that meet the first handover condition, repeats steps 812-716.

If circumstances meeting the first handover condition occur, the terminal performs handover for switching to VoWiFi service, at step 818. In other words, the terminal reconfigures the voice service path to a path for VoWiFi service and performs power control according to the reconfigured path.

For example, since the handover is for VoWiFi service, the AP 203 or CP 207 forms a voice service path to conduct the voice call based on the VoWiFi service. Examples of the voice service path formed for the VoWiFi service are shown in FIGS. 4 and 5. The voice service path for VoWiFi service shown in FIG. 4 relates to when there is an interface between the WP 205 and the CP 207. The voice service path for VoWiFi service shown in FIG. 5 relates to when there is no interface between the WP 25 and the CP 207. Since the handover is for the VoWiFi service, the AP 203 and the WP 205, which are not involved in the voice service, are set to power saving mode in order to minimize power consumed by the AP 203 and the WP 207.

If the handover for the VoWiFi service is complete, the terminal performs a voice call through the VoWiFi service, at step 820. While the VoWiFi service-based voice call is in progress, the terminal monitors whether the voice call is terminated, at step 822. Upon sensing the termination of the voice call, the terminal goes back to the main routine to terminate the voice call.

If the voice call continues, the terminal determines whether a situation meeting the second handover condition occurs, at step 824. The second handover condition may be previously configured and is a handover condition for switching the voice service from VoWiFi service to VoLTE service under circumstances where the operation mode has been set to the cellular preferred mode.

For example, since the operation mode has been set to the cellular preferred mode, it may be preferable that the second handover condition is configured to be able to determine whether the LTE network provides the minimum signal quality for voice call.

If circumstances meeting the second handover condition occur, the terminal performs handover for switching the voice service to VoLTE service, at step 826. In other words, the terminal reconfigures the voice service path to a path for VoLTE service and performs power control according to the reconfigured path.

For example, since the handover is for a VoLTE service, the voice service path is formed so that the AP 203 and the CP 207 perform a voice call based on the VoLTE service. Examples of the voice service path formed for the VoLTE service are shown in FIGS. 4 and 5. Since the call establishment is for the VoLTE service, the AP 203 and the WP 205, which are not involved in the voice service, are set to power saving mode in order to minimize power consumed by the AP 203 and the WP 205.

When the handover for VoLTE service is complete, the terminal advances to step 812 to conduct a VoLTE service-based voice call through the configured voice service path.

The terminal, without any circumstances that meet the second handover condition, repeats steps 820-824.

Figure 9:
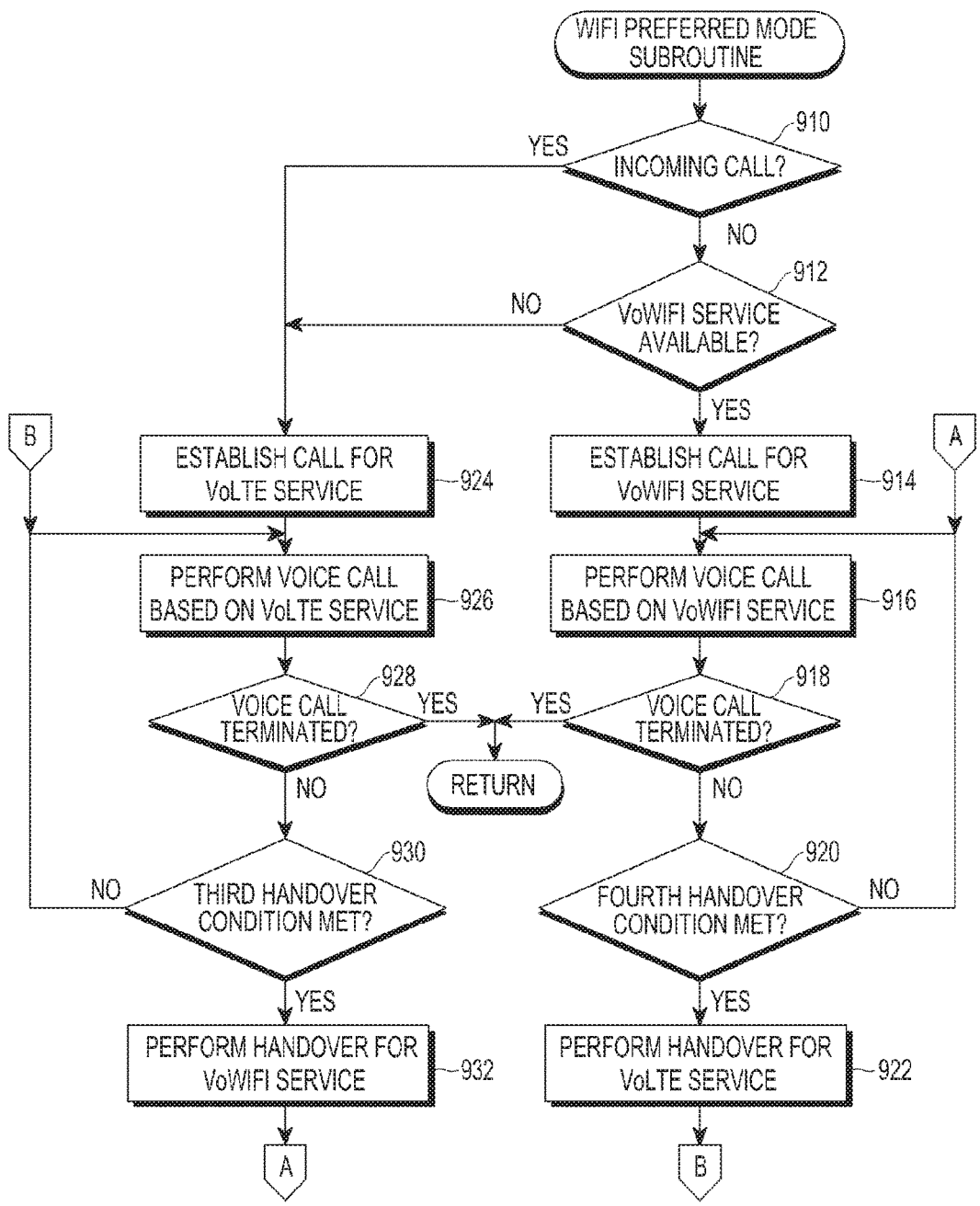
FIG. 9 is a flowchart illustrating a method of control flow of a WiFi preferred mode subroutine, according to an embodiment of the present invention.

FIG. 9 is a flowchart illustrating a method of a control flow in which a terminal provides a voice service by a WiFi preferred mode sub-routine, according to an embodiment of the present invention. Here, the terminal is presumed to support a VoLTE service and a VoWiFi service. Of course, the terminal may perform the same operation even under the situation where the terminal offers voice services based on 2G, 3G, or other typical cellular networks.

Referring to FIG. 9, the terminal determines whether the voice call request originates from an incoming call or from an outgoing call, at step 910. For example, the incoming call corresponds to a voice call request from the outside through the LTE network. The outgoing call corresponds to a request that is made in response to the user's request by the terminal for a voice call with an external terminal through the LTE network or WiFi network.

For the incoming call, the voice call should be done based on the VoLTE service. For the outgoing call, the voice call should be done based on one of the VoLTE service and the VoWiFi service when the VoWiFi service is available.

If the voice call request comes from the outgoing call, the terminal determines whether provision of the VoWiFi service is possible, at step 912. For example, since the operation mode has been set to the WiFi preferred mode, it is preferable to determine whether the provision of the VoWiFi service is possible based on whether the WiFi network provides the minimum signal quality for a voice call.

In case the provision of the VoWiFi service is possible, the terminal conducts a call establishment for the VoWiFi service, at step 914. The call establishment includes establishing a path responsive to an outgoing call and power control considering the established path.

For example, since the call establishment is for VoWiFi service, a voice service path is formed so that the AP 203 or CP 207 conduct the voice call based on the VoWiFi service. Examples of the voice service path formed for the VoWiFi service are shown in FIGS. 4 and 5. The voice service path for VoWiFi service shown in FIG. 4 relates to when there is an interface between the WP 205 and the CP 207. The voice service path for VoWiFi service shown in FIG. 5 relates to when there is no interface between the WP 205 and the CP 207. Since the handover is for the VoWiFi service, the AP 203 or the WP 205, which is not involved in the voice service, is set to power saving mode in order to minimize power consumed by the AP 203 or CP 207.

When the handover for VoWiFi service is done, the terminal conducts the VoWiFi service-based voice call through the voice service path established at step 916. While the VoWiFi service-based voice call is in progress, the terminal monitors whether the voice call is terminated, at step 918. Upon sensing the termination of the voice call, the terminal goes back to the main routine to terminate the voice call.

If the voice call continues, the terminal determines whether a situation meeting the fourth handover condition occurs, at step 920. The fourth handover condition may be previously configured and is a handover condition prepared for the terminal to switch from VoWiFi service to VoLTE service under circumstances where the operation mode has been set to the WiFi preferred mode.

For example, since the operation mode has been set to the WiFi preferred mode, the fourth handover condition may be configured to determine whether the LTE network provides the signal quality enough to be able to stably provide a voice call. For example, the signal quality used as a reference of the fourth handover condition is the signal quality of the LTE network and may be determined by, e.g., SINR, congestion, or packet error rate.

Upon meeting the fourth handover condition, the terminal performs handover for switching the voice service to VoLTE service, at step 922. In other words, the terminal reconfigures the voice service path to a path for VoLTE service and performs power control according to the reconfigured path.

For example, since the handover is for a VoLTE service, the voice service path is formed so that the AP 203 and the WP 205 conduct the voice call based on the VoLTE service. Examples of the voice service path formed for the VoLTE service are shown in FIGS. 4 and 5. Since the call establishment is for the VoLTE service, the AP 203 and the WP 205, which are not involved in the voice service, are set to power saving mode in order to minimize power consumed by the AP 203 and the WP 205.

When the handover for VoLTE service is complete, the terminal advances to step 926 to conduct a VoLTE service-based voice call through the configured voice service path.

The terminal, without any circumstances that meet the fourth handover condition, repeats steps 916-920.

In case the voice call request is determined to originate from an incoming call or provision of a VoWiFi service-based voice call is impossible, the terminal establishes a call for VoLTE service, at step 924. The call establishment includes establishing a path for a voice service responsive to an incoming call or outgoing call and power control considering the established path.

For example, since the call establishment is for a VoLTE service, the voice service path is formed so that the CP 207 conducts a VoLTE service-based voice call. Examples of the voice service path formed for the VoLTE service are shown in FIGS. 4 and 5. Since the call establishment is for the VoLTE service, the AP 203 and the WP 205, which are not involved in the voice service, are set to power saving mode in order to minimize power consumed by the AP 203 and the WP 205.

If the call establishment for the VoLTE service is done, the terminal performs a voice call through the VoLTE service, at step 926. That is, the user conducts the VoLTE service-based voice call through the terminal.

While the voice call goes on, the terminal monitors whether the voice call is terminated, at step 928. Upon sensing the termination of the voice call, the terminal goes back to the main routine to terminate the voice call.

If the voice call continues, the terminal determines whether a situation meeting the third handover condition occurs, at step 930. The third handover condition may be previously configured and is a handover condition prepared for the terminal to switch the voice service from VoLTE service to VoWiFi service under circumstances where the operation mode has been set to the WiFi preferred mode.

For example, since the operation mode has been set to the WiFi preferred mode, it may be preferable that the third handover condition is configured to be able to determine whether the LTE network provides the minimum signal quality for voice call.

The terminal, without any circumstances that meet the third handover condition, repeats steps 926-930.

If circumstances meeting the third handover condition occur, the terminal performs handover for switching the voice service to VoWiFi service, at step 932. In other words, the terminal reconfigures the voice service path to a path for VoWiFi service and performs power control according to the reconfigured path.

For example, since the handover is for VoWiFi service, the AP 203 or CP 207 form a voice service path to be able to conduct the voice call based on the VoWiFi service. Examples of the voice service path formed for the VoWiFi service are shown in FIGS. 4 and 5. Since the handover is for the VoWiFi service, the AP 203 or the WP 205, which is not involved in the voice service, are set to power saving mode in order to minimize power consumed by the AP 203 or the CP 207.

When the handover for VoWiFi service is complete, the terminal advances to step 916 to conduct a VoWiFi service-based voice call through the configured voice service path.

Figure 10:
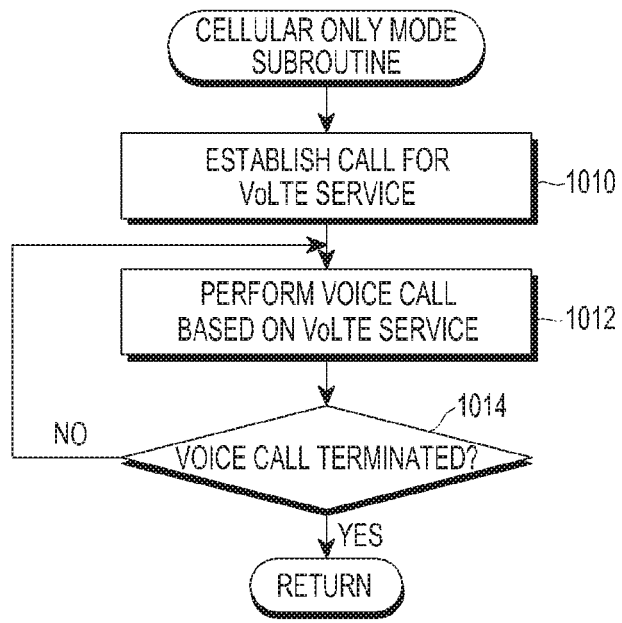
FIG. 10 is a flowchart illustrating a method of control flow of a cellular only mode subroutine, according to an embodiment of the present invention.

FIG. 10 is a flowchart illustrating a method of a control flow in which a terminal provides a voice service by a WiFi only mode sub-routine, according to an embodiment of the present invention. Here, the terminal is presumed to support a VoLTE service. Of course, the terminal may perform the same operation even under the situation where the terminal offers voice services based on 2G, 3G, or other typical cellular networks.

Referring to FIG. 10, the terminal establishes a call for a VoLTE service, at step 1010. The call establishment includes establishing a path for a voice service responsive to an incoming call or outgoing call and power control considering the established path.

For example, since the call establishment is for a VoLTE service, the voice service path is formed so that the CP 207 performs a voice call based on the VoLTE service. Examples of the voice service path formed for the VoLTE service are shown in FIGS. 4 and 5. Since the call establishment is for the VoLTE service, the AP 203 and the WP 205, which are not involved in the voice service, are set to power saving mode in order to minimize power consumed by the AP 203 and the WP 205.

If the call establishment for the VoLTE service is done, the terminal performs a voice call through the VoLTE service, at step 1012. That is, the user conducts the VoLTE service-based voice call through his terminal.

While the voice call is in progress, the terminal monitors whether the voice call is terminated, at step 1014. Upon sensing the termination of the voice call, the terminal goes back to the main routine to terminate the voice call.

Since the operation mode has been set to the cellular only mode, the terminal need not determine whether handover for changing services is required under the situation where the voice call keeps on.

Figure 11:
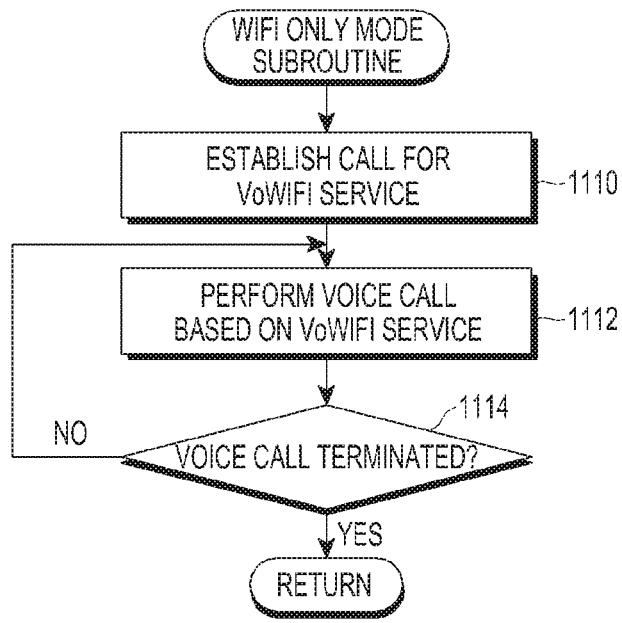
FIG. 11 is a flowchart illustrating a method of control flow of a WiFi only mode subroutine, according to an embodiment of the present invention.

FIG. 11 is a flowchart illustrating a method of a control flow in which a terminal provides a voice service by a WiFi only mode sub-routine, according to an embodiment of the present invention. Here, the terminal is presumed to support a VoWiFi service.

Referring to FIG. 11, the terminal establishes a call for a VoWiFi service, at step 1110. The call establishment includes establishing a path for a voice service responsive to an outgoing call for voice call and power control considering the established path.

For example, since the handover is for VoWiFi service, the voice service path is formed so that the AP 203 or CP 207 conducts the VoWiFi service. Examples of the voice service path formed for the VoWiFi service are shown in FIGS. 4 and 5. Since the handover is for the VoWiFi service, the AP 203 or the WP 205, which is not involved in the voice service, is set to power saving mode in order to minimize power consumed by the AP 203 or CP 207.

When the handover for VoWiFi service is done, the terminal conducts the VoWiFi service-based voice call through the voice service path established at step 1112.

While the voice call continues, the terminal monitors whether the voice call is terminated, at step 1114. Upon sensing the termination of the voice call, the terminal goes back to the main routine to terminate the voice call.

Since the operation mode has been set to the WiFi only mode, the terminal does not need to determine whether handover for changing services is required under the situation where the voice call keeps on.

According to the above described operations, the terminal does not determine whether handover is required when the operation mode has been set to the cellular only mode or WiFi only mode. Only when the operation mode has been set to the cellular preferred mode or WiFi preferred mode, the terminal may determine whether handover is required.

Different handover conditions for the terminal to determine whether handover is required may apply to the operation modes, respectively. In other words, the handover condition for the cellular preferred mode may differ from the handover condition for the WiFi preferred mode. The cellular preferred mode or the WiFi preferred mode may have different handover conditions depending on the type of a voice service providing a voice call. For example, the terminal with the operation mode set to the cellular preferred mode may have handover conditions that differ from each other depending on whether the type of voice service is the VoLTE service or the VoWiFi service.

A handover procedure preparing for the situation where different types of handover are simultaneously triggered is provided according to another embodiment of the present invention. For example, the different types of handover may include handover from LTE network to 2G or 3G network (SRVCC handover) and handover from LTE network to WiFi network (handover for switching from VoLTE service to VoWiFi service).

By way of example, when the user is home, SRVCC handover and handover for switching from VoLTE service to VoWiFi service may be simultaneously triggered. This may happen because the SRVCC handover is triggered by the network and the handover for switching to VoWiFi service is triggered by the terminal.

Triggering the SRVCC handover may be caused by a deteriorated signal quality of the LTE network, and triggering the handover for switching to VoWiFi service may be caused by detection of the WiFi network (access point).

Typically, in order to perform SRVCC handover, the base station (eNB) in the LTE network determines the availability of the LTE network using a result measured by the terminal. For example, the LTE network base station (eNB) instructs the terminal to perform measurement on a legacy network and determines handover based on the result of the measurement performed by the terminal in response to the instruction.

The SRVCC handover procedure is described. The MME sends a 'PS to CS handover request' to the MSC of the legacy network. The 'PS to CS handover request' is to request handover from packet switching (PS) mode to circuit switching (CS) mode.

The MSC determines whether to do handover, preparations for handover, and then requests the IMS server to perform a session transfer. The IMS server performs the session transfer and releases the IMS access leg connecting the LTE network. The MSC sends a 'PS to CS handover response' to the MME. When sending the 'PS to CS handover response' to the MME, the MSC transfers information necessary for handover to the MME.

After receiving the handover instruction, the terminal accesses the legacy network and sends a handover complete message, enabling a voice call through the legacy network.

The foregoing that SRVCC handover is a scheme separately carried out without a sync between the handover on the network and the handover on the terminal.

The handover for switching from VoLTE service to VoWiFi service is triggered by the terminal's determination on handover conditions. For example, in a case of the WiFi network interworking with the core network of the LTE network by way of an ePDG upon handover to VoWiFi service, the terminal may access the PGW through the authentication procedure defined in the standards. The PGW, upon receiving the handover request from the terminal through the ePDG, switches the data path from the LTE network to the WiFi network through the ePDG, performing handover.

Figure 12:
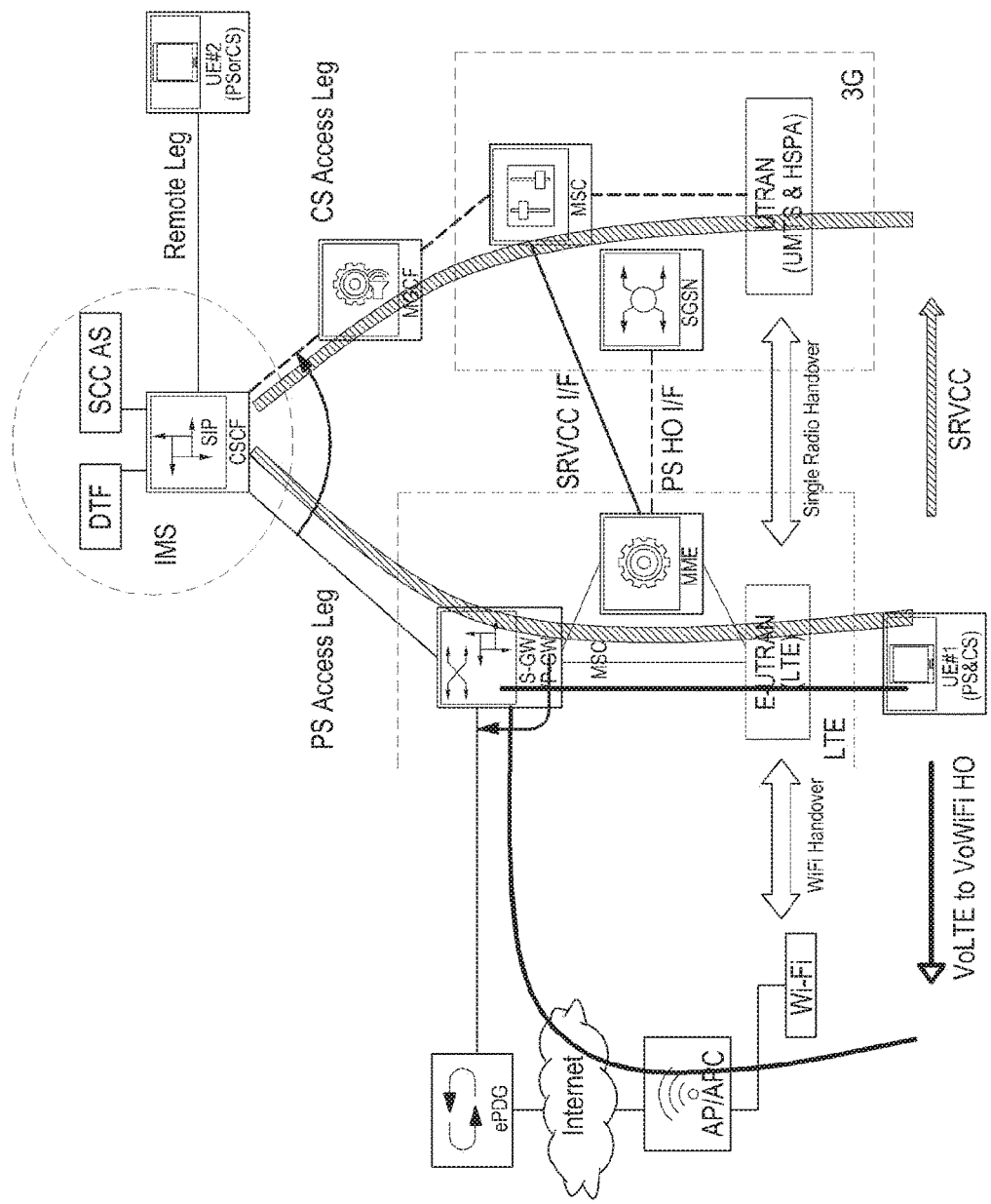
FIG. 12 is a diagram illustrating a handover scenario, according to an embodiment of the present invention.

FIG. 12 is a diagram illustrating a handover, e.g., predicted in heterogeneous wireless networks, according to an embodiment of the present invention. Assume that the heterogeneous wireless networks include a WiFi network, an LTE network, and a 2G or 3G network (hereinafter, collectively referred to as a '3G network').

Referring to FIG. 12, the scenario assumes that the terminal shifts to the position where handover from the LTE network to the 3G network (SRVCC handover) and handover from the LTE network to the WiFi network (hereinafter, referred to as 'VoWiFi handover') are both available.

The SRVCC handover is processed by the MME, MSC, and IMS server, and the VoWiFi handover is processed by the ePDG and PGW. Since the SRVCC handover is triggered by the network, and the VoWiFi handover is triggered by the terminal, a situation where the SRVCC handover and the VoWiFi handover are simultaneously triggered may happen. It is difficult for both the network and the terminal to identify the situation where different types of handover are simultaneously triggered.

For example, in a case where the terminal triggers VoWiFi handover while preparing for SRVCC handover, the PGW switches the data path to the WiFi network. In such a case, the MSC transmits to the IMS server a 'session transfer request' for requesting a session transfer. The IMS server releases the access leg to the PGW.

The terminal receives an SRVCC handover command after VoWiFi handover is triggered, or handover for a VoWiFi service may be triggered after the terminal receives an SRVCC handover command.

As described above, in a case where the two types of handover are simultaneously performed, the handover might not be normally done. For example, in a case where the terminal triggers the VoWiFi handover while preparing for the SRVCC handover (i.e., before the handover command is transmitted to the terminal), the MSC sends a 'PS to CS handover response' to the MME.

The transmission of the 'PS to CS handover response' by the MSC is made after the PGW has switched the voice path to the WiFi network. As such, the VoLTE service will have been already released. Thus, the SRVCC handover cannot be performed. In other words, although the terminal has completed the VoWiFi handover, the IMS server performs the session transfer, and thus the access leg to the WiFi network is released. Therefore, the voice call drops. In some situations, the IMS server performs the PS to CS session transfer, and the terminal might not perform the SRVCC handover.

In order to properly perform handover when different types of handover simultaneously occur, the terminal determines whether the VoWiFi handover is triggered at each stage of the SRVCC handover procedure.

Figure 13:
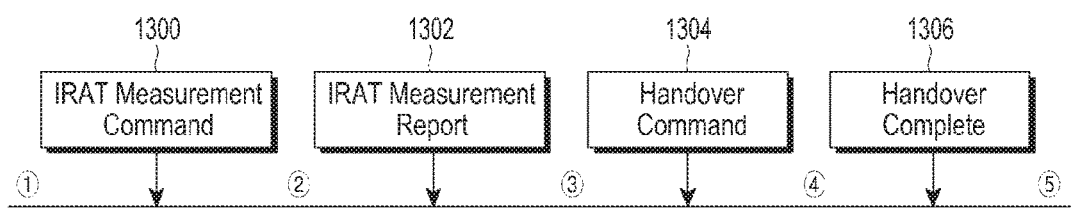
FIG. 13 is a diagram illustrating examples of sections where recognition is required in an SRVCC handover procedure, according to an embodiment of the present invention.

FIG. 13 illustrates examples of sections where recognition is required by a terminal in an SRVCC handover procedure, according to an embodiment of the present invention.

Referring to FIG. 13, the SRVCC handover procedure is differentiated according to IRAT measurement command 1300, IRAT measurement report 1302, handover command 1304, and handover complete 1306. As an example, the SRVCC handover procedure is separated into a section before an IRAT measurement command is transmitted, at position (1), a section before an IRAT measurement is reported after the IRAT measurement command has been transmitted, at position (2), a section before a handover command is transmitted after the IRAT measurement has been reported, at position (3), a section before handover is complete after the handover command has been transmitted, at position (4), and a section where the handover is complete, at position (5).

The WiFi preferred mode requires VoWiFi handover to be considered in preference to SRVCC handover.

First, in a case where the conditions for VoWiFi handover are met before the IRAT measurement command is received, at position (1), or before the IRAT measurement report is sent although the IRAT measurement command has been received, at position (2), the terminal performs the VoWiFi handover without sending out the IRAT measurement report.

If the VoWiFi handover is complete, the data link to the LTE network for VoLTE service is released, and the LTE network terminates the procedure for SRVCC handover. The terminal attempts to do VoWiFi handover. Upon failure, the terminal performs IRAT measurement and sends the IRAT measurement report for reporting the result of the IRAT measurement to enable the SRVCC handover procedure to be normally carried out.

Second, in a case where the conditions for VoWiFi handover are met after the IRAT measurement report has been already sent out, at position (2), the network might have already prepared for SRVCC handover, and thus, a conflict may occur. This is why if the SRVCC handover were being prepared, although the VoWiFi handover had been successfully completed, the voice call would be dropped. In such a case, the terminal conducts VoWiFi handover at any rate. Unless voice packets are properly received even after VoWiFi handover has been successfully done, the terminal deems that session transfer has been successfully done in the IMS server. At this time, the terminal sends an invite message to the IMS server to request a session transfer to the PS domain.

Third, the terminal may delay triggering VoWiFi handover for a predetermined time to examine whether a handover command is received, at position (4).

In a case where the conditions for VoWiFi handover are met before the handover complete message is sent out after the handover command has been received, at position (4), the terminal conducts VoWiFi handover without sending out a handover complete message. Unless normal voice packets are received after the VoWiFi handover has been done, the terminal sends an invite message to the IMS server to request a session transfer to the PS domain.

Fifth, in a case where the conditions for VoWiFi handover are met after the terminal has sent out the handover complete message, at position (5), the terminal carries out CS voice to VoWiFi handover (SRVCC) if the network is supportive of the same.

Next, the cellular preferred mode requires SRVCC handover to be considered in preference to VoWiFi handover.

For example, once an IRAT measurement command has been issued from the network, different handover conditions from existing handover conditions may apply to the LTE network. In other words, the LTE network and the WiFi network, even when satisfying existing VoLTE to VoWiFi handover conditions, wait for the SRVCC handover to be triggered without conducting LTE to VoWiFi handover. Thereafter, the SRVCC handover, if triggered, is carried out. However, in a case where the LTE network is deteriorated to the extent that it cannot receive a command as per SRVCC handover (a new handover condition), VoWiFi handover is performed.

While the present invention has been shown and described with reference to certain embodiments thereof, it should be understood by those skilled in the art that many variations and modifications of the method and apparatus described herein will still fall within the spirit and scope of the present invention as defined in the appended claims and their equivalents.

What is claimed is:

1. A portable communication device comprising:
   a first communication circuitry corresponding to a wireless fidelity (Wi-Fi) network;
   a second communication circuitry corresponding to a cellular network; and
   a processor adapted to:
      while a voice call is performed via the Wi-Fi network in a selected one operation mode of a plurality of operation modes, determine that the cellular network is available for the voice call based at least in part on state information related to the cellular network, the plurality of operation modes including a first operation mode corresponding to the Wi-Fi network and a second operation mode corresponding to the cellular network;
      if the selected one operation mode corresponds to the first operation mode and the cellular network is available for the voice call, determine that state information related to the Wi-Fi network satisfies a specified condition associated with the first operation mode; and
      based at least in part on the determining that the state information related to the Wi-Fi network satisfies the specified condition, maintain, using the first communication circuitry, the voice call via the Wi-Fi network.

2. The portable communication device of claim 1, wherein the processor is further adapted to:
obtain, using the first communication circuitry, signal quality information corresponding to the Wi-Fi network while the voice call is performed via the Wi-Fi network; and
identify the signal quality information as at least part of the state information related to the Wi-Fi network.

3. The portable communication device of claim 2, wherein the processor is further adapted to:
as at least part of the determining that the state information related to the Wi-Fi network satisfies the specified condition, determine that the signal quality information exceeds a threshold associated with the Wi-Fi network.

4. The portable communication device of claim 1, wherein the processor is further adapted to:
obtain, using the second communication circuitry, signal quality information corresponding to the cellular network while the voice call is performed via the Wi-Fi network; and
identify the signal quality information as at least part of the state information related to the cellular network.

5. The portable communication device of claim 1, further comprising a touchscreen display, wherein the processor is further adapted to:
select the one operation mode of the plurality of operation modes based at least in part on a user input received via the touchscreen display before the voice call is performed.

6. The portable communication device of claim 1, wherein the processor is further adapted to:
as at least part of the maintaining the voice call, refraining from performing a handover from the Wi-Fi network to the cellular network.

7. The portable communication device of claim 1, wherein the processor is further adapted to:
based at least in part on a determination that the state information related to the Wi-Fi network does not satisfy the specified condition, perform a handover from the Wi-Fi network to the cellular network while the voice call is maintained.

8. The portable communication device of claim 7, wherein the processor is further adapted to:
as at least part of the performing of the handover, perform, using the second communication circuitry, the voice call via the cellular network.

9. The portable communication device of claim 1, wherein the processor is further adapted to:
obtain, using the first communication circuitry, network delay information corresponding to the Wi-Fi network while the voice call is performed via the Wi-Fi network; and
identify the network delay information as at least part of the state information related to the Wi-Fi network.

10. A portable communication device comprising:
a first communication circuitry corresponding to a wireless fidelity (Wi-Fi) network;
a second communication circuitry corresponding to a cellular network; and
a processor adapted to:
while a voice call is performed via the cellular network in a selected one operation mode of a plurality of operation modes, detect the Wi-Fi network available for the voice call based at least in part on state information related to the Wi-Fi network, the plurality of operation modes including a first operation mode corresponding to the Wi-Fi network and a second operation mode corresponding to the cellular network;
if the selected one operation mode corresponds to the second operation mode and the Wi-Fi network available for the voice call is detected, determine that state information related to the cellular network satisfies a specified condition associated with the second operation mode; and
based at least in part on the determining that the state information related to the cellular network satisfies the specified condition, maintain, using the second communication circuitry, the voice call via the cellular network.

11. The portable communication device of claim 10, wherein the processor is further adapted to:
obtain, using the second communication circuitry, signal quality information corresponding to the cellular network while the voice call is performed via the cellular network; and
identify the signal quality information as at least part of the state information related to the cellular network.

12. The portable communication device of claim 11, wherein the processor is further adapted to:
as at least part of the determining that the state information related to the cellular network satisfies the specified condition, determine that the signal quality information exceeds a threshold associated with the cellular network.

13. The portable communication device of claim 10, wherein the processor is further adapted to:
obtain, using the first communication circuitry, signal quality information corresponding to the Wi-Fi network while the voice call is performed via the cellular network; and
identify the signal quality information as at least part of the state information related to the Wi-Fi network.

14. The portable communication device of claim 10, further comprising a touchscreen display, wherein the processor is further adapted to:
select the one operation mode of the plurality of operation modes based at least in part on a user input received via the touchscreen display before the voice call is performed.

15. The portable communication device of claim 10, wherein the processor is further adapted to:
as at least part of the maintaining the voice call, refraining from performing a handover from the cellular network to the Wi-Fi network.

16. The portable communication device of claim 10, wherein the processor is further adapted to:
based at least in part on a determination that the state information related to the cellular network does not satisfy the specified condition, perform a handover from the cellular network to the Wi-Fi network while the voice call is maintained.

17. The portable communication device of claim 16, wherein the processor is further adapted to:
as at least part of the performing of the handover, perform, using the first communication circuitry, the voice call via the Wi-Fi network.

18. The portable communication device of claim 10, wherein the processor is further adapted to:

obtain, using the second communication circuitry, network delay information corresponding to the cellular network while the voice call is performed via the cellular network; and
identify network delay information as at least part of the state information related to the cellular network.

19. A portable communication device comprising:
a first communication circuitry corresponding to a first network;
a second communication circuitry corresponding to a second network; and
a processor adapted to:
while a voice call is performed via the first network in a selected one operation mode of a plurality of operation modes, determine that the second network is available for the voice call based at least in part on state information related to the second network, the plurality of operation modes including a first operation mode corresponding to the first network and a second operation mode corresponding to the second network;

if the selected one operation mode corresponds to the second operation mode and the second network is available for the voice call, determine that state information related to the first network satisfies a specified condition associated with the second operation mode; and based at least in part on the determining that the state information related to the first network satisfies the specified condition, perform a handover from the first network to the second network while the voice call is maintained.

20. The portable communication device of claim 19, further comprising a touchscreen display, wherein the processor is further adapted to:

select the one operation mode of the plurality of operation modes based at least in part on a user input received via the touchscreen display before the voice call is performed.

* * * * *